(No Model.)
L. FROMM.
METALLIC THERMOMETER.
No. 439,239. Patented Oct. 28, 1890.
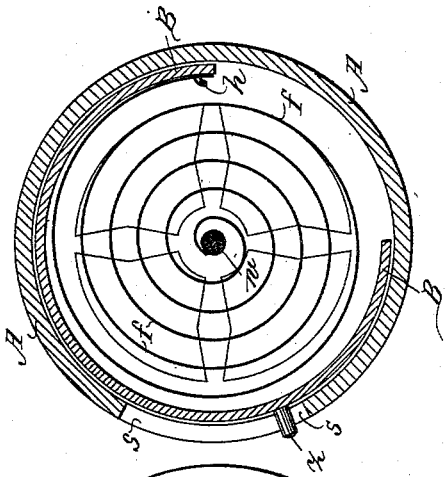
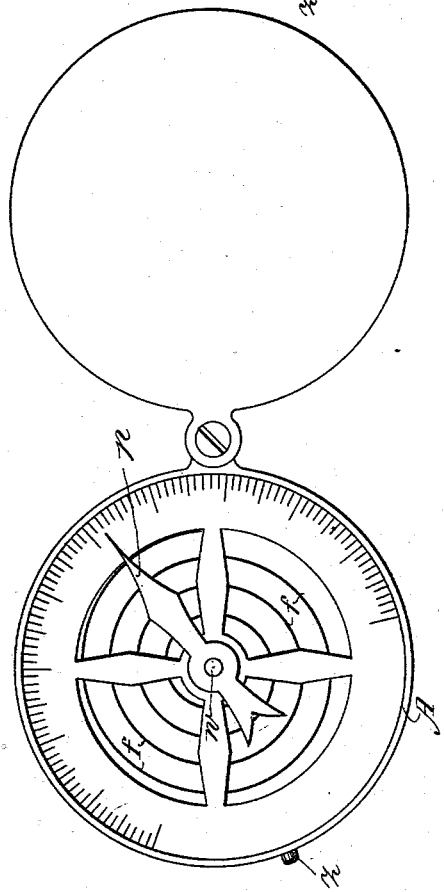
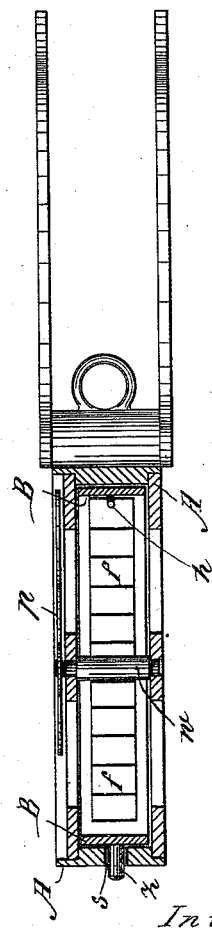
Witnesses:
Inventor:
Ludwig Fromm
by
Attorneys.

UNITED STATES PATENT OFFICE.

LUDWIG FROMM, OF PFORZHEIM, GERMANY.

METALLIC THERMOMETER.

SPECIFICATION forming part of Letters Patent No. 439,239, dated October 28, 1890.

Application filed November 23, 1889. Serial No. 331,350. (No model.)

*To all whom it may concern:*

Be it known that I, LUDWIG FROMM, of Pforzheim, Lindenstrasse, 42, in the Grand Duchy of Baden, German Empire, and a subject of the Grand Duke of Baden, have invented certain new and useful Improvements in Thermometers, of which the following is a clear specification.

My invention relates to metallic thermometers of simple construction, in which the tension of the spring may be adjusted at any time.

In order to make my invention more clear, I refer to the accompanying drawings, which form part of this specification, and in which similar letters denote similar parts throughout the several views.

Figure 1 is a view of the thermometer and protecting-case. Fig. 2 is a sectional side view of the device shown in Fig. 1. Fig. 3 is a sectional plan of the thermometer.

$f$ is a spring, formed of two flat thin bands, one of silver and one of platinum, so welded together that the silver band lies inside while the platinum comes outside of the coil. The silver side of the spring consequently comes against the pivot $w$, which is fixed to that end of the spring.

The slide B fits inside the case A, its elasticity causing it to lie closely against the inside of the same. Slide B has, further, on its inside the hook $h$, which is attached to one end of the spring $f$, and on its outside the pin $z$, moving in a slit $s$ in the casing A, Fig. 3. The friction of slide B against the side of the casing A is sufficient to overcome the force of the spring $f$. Thus one end of the spring $f$ is attached to the pivot $w$, the ends of which are fixed in the bottom and top cover of the casing A. The one end of pivot $w$ projects through the cover of the casing, and to it is fastened the pointer $p$, Fig. 2. By means of pin $z$ the pointer will be placed on $0°$ of the scale on the spring being exposed to the corresponding temperature. On an increase of temperature the spring will expand and the pointer will be turned to occupy a corresponding position on the scale. On decrease of temperature the pointer will of course be moved backward.

This thermometer is, as shown in Fig. 1, pivoted to a protecting-case and can be conveniently carried about in the pocket. I can of course attach the scale-disk to the pivot $w$ and make the pointer fixed, so that the former revolves round the latter without altering the principle of my invention.

Having thus fully described the nature of my invention, what I desire to secure by Letters Patent of the United States, is—

In metallic thermometers, the combination of the casing A, having the slit $s$ in its side, the spring $f$, and the pivot $w$, with the pointer mounted thereon and the slide B, provided with the pin $z$, projecting through the slit $s$, and provided also with the hook $h$, to which the spring $f$ is attached.

In witness whereof I have hereunto set my hand in presence of two witnesses.

LUDWIG FROMM.

Witnesses:
LEISE HEILMANN,
KARL REHN.